US010532271B2

(12) United States Patent
Oh

(10) Patent No.: US 10,532,271 B2
(45) Date of Patent: Jan. 14, 2020

(54) DATA PROCESSING METHOD FOR REACTIVE AUGMENTED REALITY CARD GAME AND REACTIVE AUGMENTED REALITY CARD GAME PLAY DEVICE, BY CHECKING COLLISION BETWEEN VIRTUAL OBJECTS

(71) Applicant: Chol Whan Oh, Seoul (KR)

(72) Inventor: Chol Whan Oh, Seoul (KR)

( * ) Notice: Subject to any disclaimer, the term of this patent is extended or adjusted under 35 U.S.C. 154(b) by 0 days.

(21) Appl. No.: 15/563,213

(22) PCT Filed: Aug. 29, 2016

(86) PCT No.: PCT/KR2016/009604
§ 371 (c)(1),
(2) Date: Sep. 29, 2017

(87) PCT Pub. No.: WO2017/069396
PCT Pub. Date: Apr. 27, 2017

(65) Prior Publication Data
US 2018/0214767 A1    Aug. 2, 2018

(30) Foreign Application Priority Data

Oct. 23, 2015 (KR) .................. 10-2015-0147937
Jan. 12, 2016 (KR) .................. 10-2016-0003626

(51) Int. Cl.
*A63F 1/04* (2006.01)
*G06K 9/78* (2006.01)
(Continued)

(52) U.S. Cl.
CPC ................ *A63F 1/04* (2013.01); *A63F 13/42* (2014.09); *A63F 13/65* (2014.09); *A63F 13/80* (2014.09);
(Continued)

(58) Field of Classification Search
CPC .... A63F 1/04; A63F 1/00; A63F 13/42; A63F 13/65; A63F 2009/2486; A63F 2009/2411;
(Continued)

(56) References Cited

U.S. PATENT DOCUMENTS 8,152,637 B2 * 4/2012 Watanabe ............... A63F 13/10
463/11
9,717,981 B2 * 8/2017 Robbins .................... A63F 9/24
(Continued)

FOREIGN PATENT DOCUMENTS

JP    2005-095387 A    4/2005
JP    2007-075606 A    3/2007
(Continued)

OTHER PUBLICATIONS

Drakerz Confrontation, Published May 15, 2014, <https://www.youtube.com/watch?v=J45TD6FoQOM> (Year: 2014).*

*Primary Examiner* — Chase E Leichliter
(74) *Attorney, Agent, or Firm* — Heedong Chae; Lucem, PC

(57) ABSTRACT

The present invention relates to a data processing method for a reactive augmented reality card game and a reactive augmented reality card game play device and, more particularly, to a data processing method for a reactive augmented reality card game and a reactive augmented reality card game play device, by checking collision between virtual objects, in which preconfigured animation data is processed and reproduced by checking collision between virtual objects.

15 Claims, 11 Drawing Sheets

(51) Int. Cl.
*A63F 13/65* (2014.01)
*A63F 13/80* (2014.01)
*A63F 13/42* (2014.01)
*G06K 9/00* (2006.01)
*G06T 13/20* (2011.01)
*G06T 19/00* (2011.01)
*A63F 13/352* (2014.01)
*A63F 13/58* (2014.01)

(52) U.S. Cl.
CPC ........... *G06K 9/00671* (2013.01); *G06K 9/78* (2013.01); *G06T 13/20* (2013.01); *G06T 19/006* (2013.01); *A63F 13/352* (2014.09); *A63F 13/58* (2014.09); *G06T 2210/21* (2013.01)

(58) Field of Classification Search
CPC .. A63F 2009/2414; A63F 9/24; G06T 19/006; A61B 2090/365; G06K 9/00671; G05B 2219/39449
USPC ............................................ 463/30–34, 42, 1
See application file for complete search history.

(56) References Cited

U.S. PATENT DOCUMENTS

| | | | |
|---|---|---|---|
| 10,068,547 B2* | 9/2018 | Sobeski | G09G 5/026 |
| 10,186,084 B2* | 1/2019 | Tawara | G06T 19/006 |
| 2003/0062675 A1* | 4/2003 | Noro | A63F 3/00643 273/237 |
| 2006/0189367 A1* | 8/2006 | Nguyen | G07F 17/32 463/16 |
| 2012/0015333 A1* | 1/2012 | Self | G09B 5/062 434/167 |
| 2012/0015341 A1* | 1/2012 | Self | G09B 5/02 434/365 |
| 2012/0083325 A1* | 4/2012 | Heatherly | A63F 9/24 463/16 |
| 2012/0218298 A1* | 8/2012 | Hayakawa | G06F 3/011 345/633 |
| 2012/0218299 A1* | 8/2012 | Hayakawa | A63F 13/06 345/633 |
| 2014/0357366 A1* | 12/2014 | Koganezawa | G06T 19/006 463/31 |
| 2016/0067616 A1* | 3/2016 | Yim | A63F 13/655 463/34 |

FOREIGN PATENT DOCUMENTS

| | | |
|---|---|---|
| JP | 2011-062390 A | 3/2011 |
| KR | 10-0834904 B1 | 6/2008 |
| KR | 10-2014-0139394 A | 12/2014 |

* cited by examiner

FIG. 1
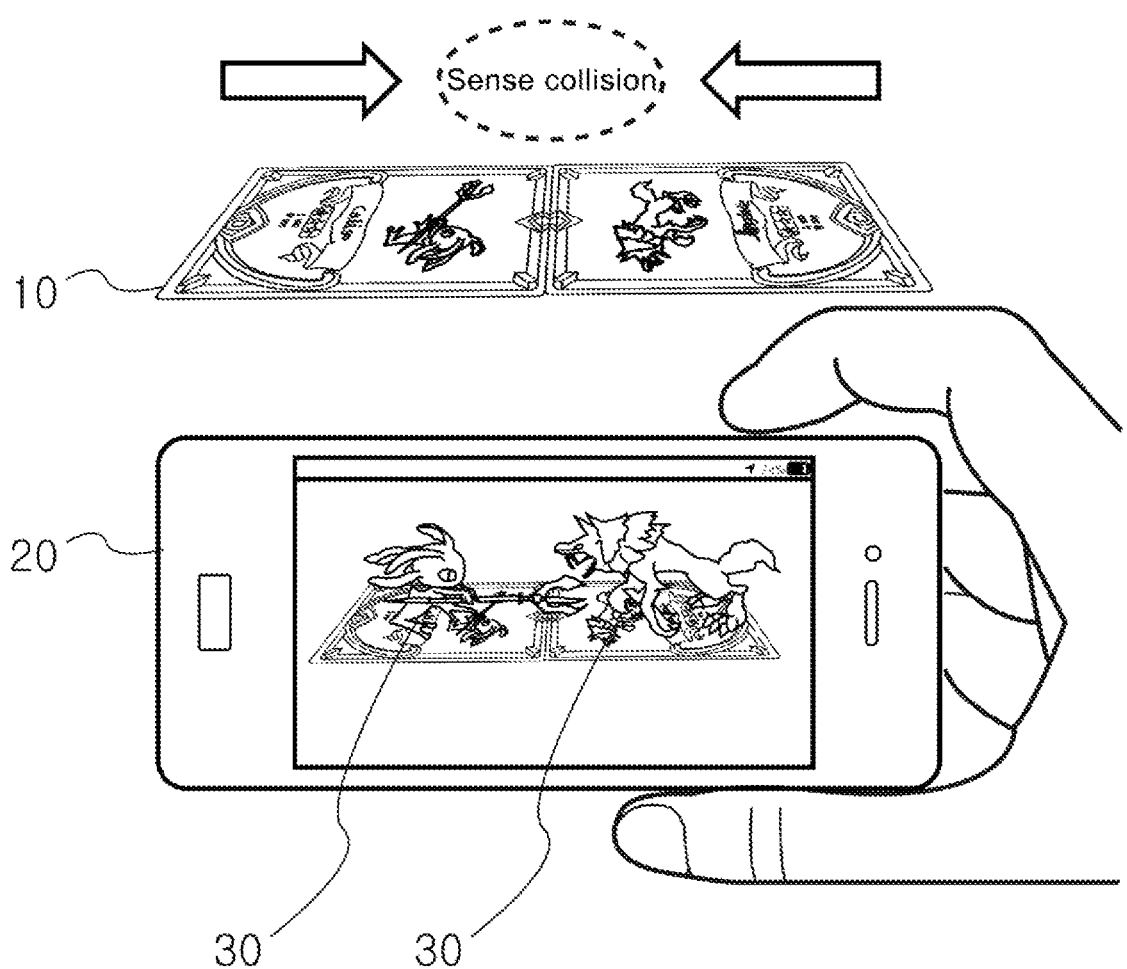
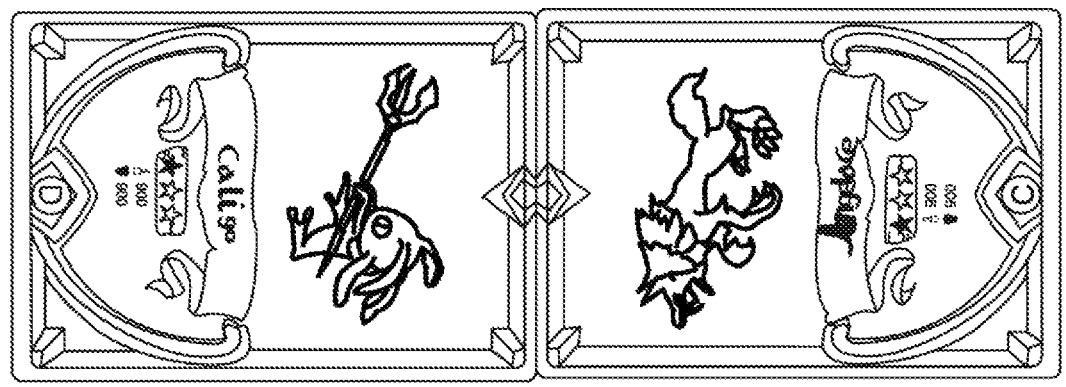

FIG. 2
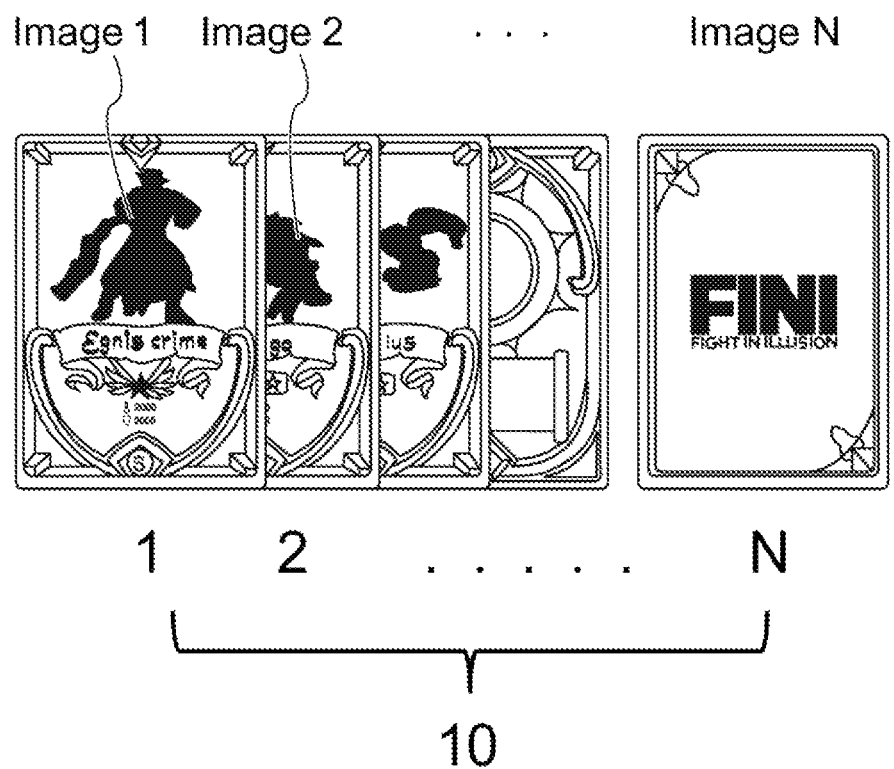
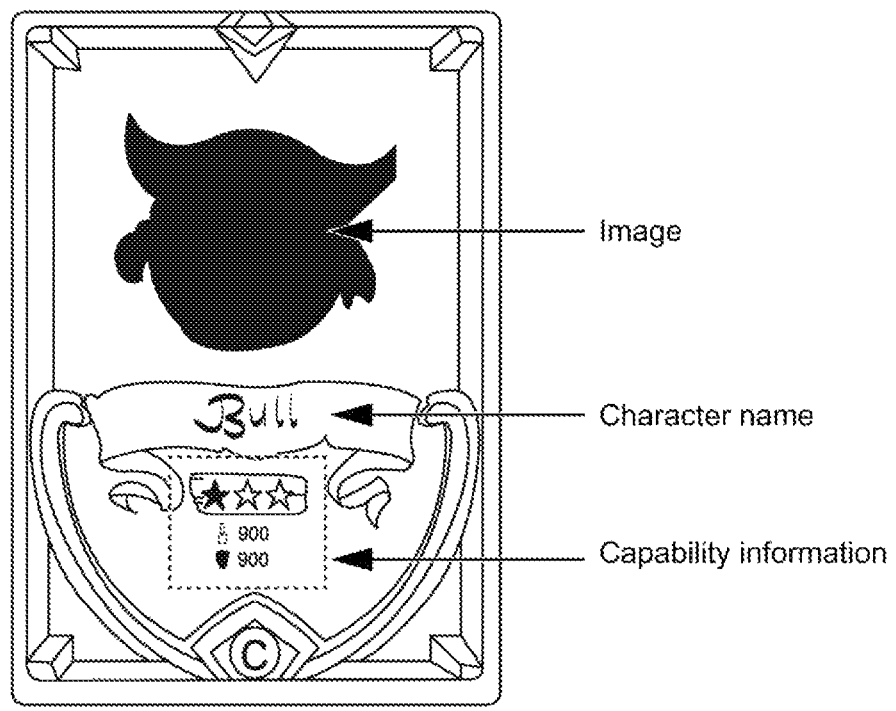

FIG. 7

| Card DB | Virtual object | |
|---|---|---|
| Card 1 | Character 1 | |
| Card 2 | Character 2 | |
| Card 3 | Character 3 | |
| ⋮ | ⋮ | |

| Character DB | Physical strength variable | Striking power variable | Attribute | Attack interval |
|---|---|---|---|---|
| Character 1 | HP1 | ATTACK 1 | Water | INTERVAL 1 |
| Character 2 | HP2 | ATTACK 2 | Fire | INTERVAL 2 |
| Character 3 | HP3 | ATTACK 3 | Wind | INTERVAL 3 |
| ⋮ | ⋮ | ⋮ | ⋮ | ⋮ |

| Animation DB | Standby state | Attack state | Stop state |
|---|---|---|---|
| Character 1 | Standby action 1 | Attack action 1 | Failure action 1 |
| Character 2 | Standby action 2 | Attack action 2 | Failure action 2 |
| Character 3 | Standby action 3 | Attack action 3 | Failure action 3 |
| ⋮ | ⋮ | ⋮ | ⋮ |

FIG. 8
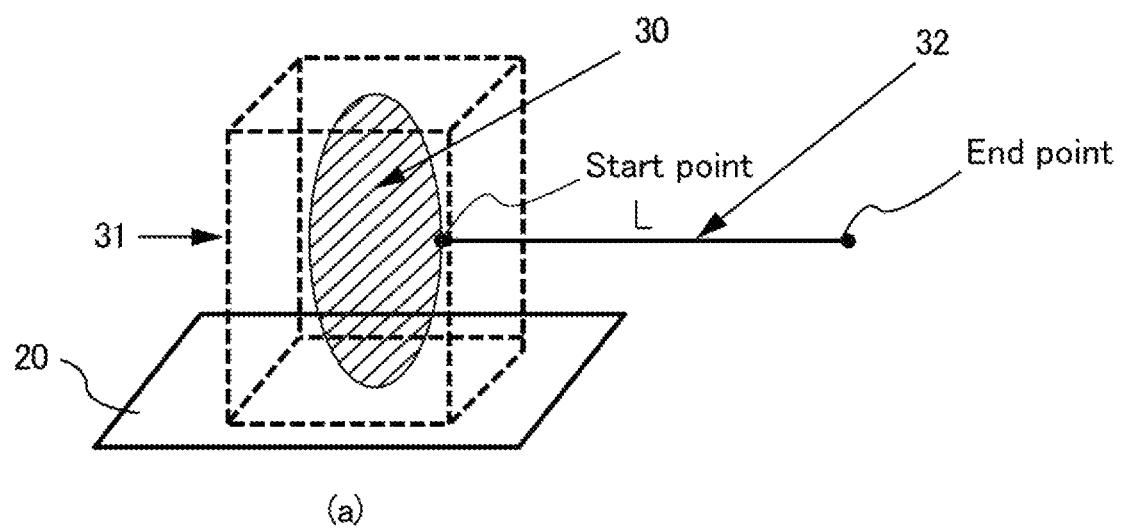
(a)
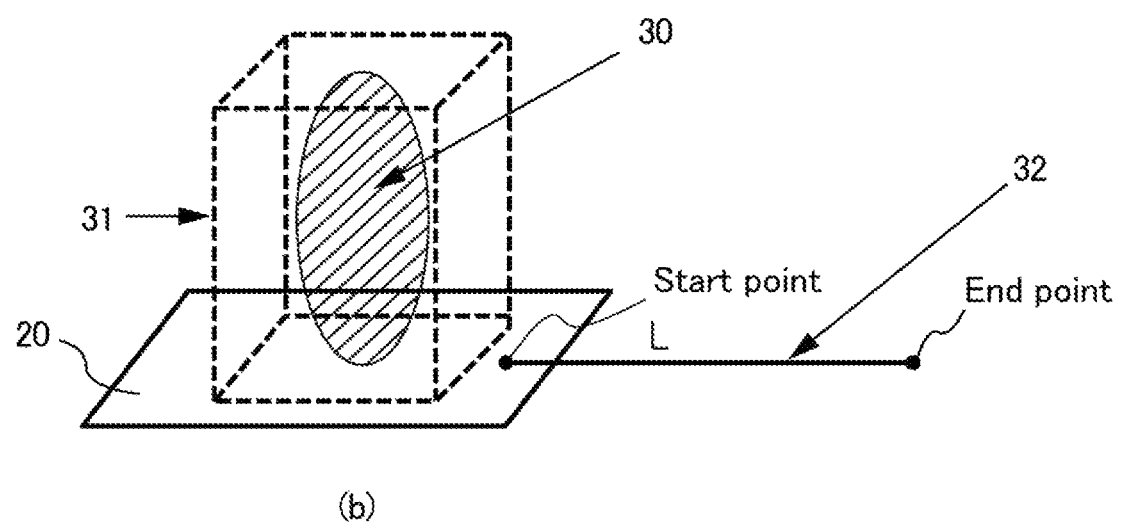
(b)

DATA PROCESSING METHOD FOR REACTIVE AUGMENTED REALITY CARD GAME AND REACTIVE AUGMENTED REALITY CARD GAME PLAY DEVICE, BY CHECKING COLLISION BETWEEN VIRTUAL OBJECTS

CROSS-REFERENCE TO RELATED APPLICATIONS

This application claims the benefit of Korean Application No. 10-2015-0147937 filed on Oct. 23, 2015, and Korean application No. 10-2016-0003626 filed on Jan. 12, 2016 with the Korean Intellectual Property Office, the disclosure of which is incorporated herein by reference.

TECHNICAL FIELD

The present invention relates to a method of processing data in a reactive augmented reality card game and a device for playing a reactive augmented reality game and, more particularly, to a method of processing data in a reactive augmented reality card game and a device for playing a reactive augmented reality card game based on the check of a collision between virtual objects, wherein predetermined animation data is played back by processing the animation data based on the check of a collision between virtual objects.

BACKGROUND ART

Augmented reality (AR) is a kind of mixed reality, that is, a region between reality and virtuality, and means that information of a thing or a video or image thereof is augmented by composing virtual information and real information. The augmented reality is also called extended reality in terms that the sense and recognition of a person for a thing is extended by adding additional virtual information to actual information.

Meanwhile, recently, with the help of the spread of a mobile device on which a camera has been mounted, such as a smartphone and a tablet computer, the application area of the augmented reality technology is extended to mobiles and a variety of types of sensor parts for sensing a location, direction and slope, such as a GPS, are mounted on the mobile device. Accordingly, a base capable of implementing augmented reality by sensing the location, height and direction of an actual object using the mobile device has been prepared. An augmented reality system based on such a portable mobile device is called mobile augmented reality.

Meanwhile, a card game in which each player determines a character appearing in the game in a card received offline and the capability variable of the corresponding character and performs a battle game in accordance with a predetermined game rule using the capability variable is the vogue. In the case of such a battle game, in the capability variable of a character, physical strength, striking power, defense power, etc. are set and used as the attributes of the character that performs a battle.

A battle game using such a card is purely played as a traditional offline card game, and it is also implemented in a form that operates in conjunction with a dedicated game machine, a personal computer, a smart device and a dedicated game server with the development of the IT technology.

In particular, recently, a technology and game content in which the augmented reality technology through a mobile device having a camera mounted thereon and a game using a card are grafted are being attempted.

In this augmented reality technology, in general, each of a plurality of markers is recognized, and a virtual object corresponding to each recognized marker is independently synthesized with the location of each marker and expressed. There may be used a technology in which when a plurality of markers is recognized and any one marker is moved aside, that is, when any one marker enters a preset distance from the other marker, an interaction between virtual objects that responds by recognizing the distance between the markers is performed.

Furthermore, as the development of part of the technology, as in Patent Document below, a method of implementing an interaction using the locations of a plurality of markers printed on cards may be attempted by implementing an augmented reality device and method for previously defining the mutual actions of virtual objects based on the slopes, directions, distances and types (ID) of the markers printed on the cards and representing the action of a pre-defined virtual object based on the type ID of a corresponding marker when the slope, direction and distance of a recognized marker are changed.

The technology of Patent Document below is a method of defining a new marker based on a relative location (slope, direction and distance) between markers respectively printed on two cards, and may be used to implement an interaction in such a way as to play back an animation previously assigned to the new marker.

However, the technology of Patent Document below has a problem in that responding to game play by setting or resetting a game situation according to various variables is limited because a situation is set in such a way as to assign an animation based on a new marker defined according to a relative location of a printed marker.

That is, if the technology is applied to a card battle game, a predetermined result value, such as assigning an animation according to a relative location of a marker, is reflected. Accordingly, it is impossible to set or reset capability variables, such as physical strength, striking power and defense power set or reset, according to the progress of game in addition to the play of an animation and to dynamically process animation data in response to a change in the capability variable. As a result, the technology has a technological limit to the application of a game that requires various game situation presentments.

Furthermore, the number of printed markers that must be recognized is increased according to an increase in the type of card because a new marker and each animation must be defined in response to a situation according to a relative location between markers. Accordingly, the number of new markers and animations that must be recognized according to their relative locations is also increased.

For example, if the number of markers printed on a card is 10 and a relative location between markers printed on two cards is to be recognized, the number of markers newly recognized and the number of animations allocated thereto are 90.

If the number of markers that must be newly recognized and the number of animations allocated thereto are increased as described above, the technology has a problem in that it is not suitable for a mobile device having limited augmented reality processing resources because a load of the mobile device that processes augmented reality and the amount of data to be processed are suddenly increased.

Furthermore, the technology is a method of defining a new marker based on a relative location between markers and recognizing the new marker. If the relative location values of a plurality of recognized markers, that is, the conditions of an angle, distance and direction, are not accurately matched, there is a problem in that a recognition ratio is fundamentally low because a new marker is not recognized. In particular, if the technology is applied to a card battle game in which cards are frequently overlapped, there is a frequent problem in that a new marker itself is not recognized due to the deformation of an image attributable to the overlap of markers during the play of the game.

Accordingly, it is practically impossible to apply the conventional technology to a card battle game. There is an urgent need for a new technology capable of efficiently processing an interaction action between characters that are composed and displayed on an augmented reality processing device as a technology in which the augmented reality technology and the card battle game are grafted.

PRIOR ART DOCUMENT

Patent Document 1

Korean Patent No. 10-1227237 (The title of the invention: AUGMENTED REALITY SYSTEM AND METHOD FOR REALIZING INTERACTION BETWEEN VIRTUAL OBJECT USING THE PLURAL MARKER published on Jan. 28, 2013)

DISCLOSURE

Technical Problem

Accordingly, the present invention is a technology in which an augmented reality technology and a card battle game are grafted, and an object of the present invention is to provide a method of processing data in a reactive augmented reality card game and a device for playing a reactive augmented reality card game based on the check of a collision between virtual objects, which efficiently process an interaction action between characters that are composed and displayed on an augmented reality processing device.

Furthermore, an object of the present invention is to provide a method of processing data in a reactive augmented reality card game and a device for playing a reactive augmented reality card game based on the check of a collision between virtual objects, which can recognize various game situations in response to a change in the state of an actual card according to the progress of a card battle game and can respond by setting or resetting a capability variable, etc.

Furthermore, an object of the present invention is to provide a method of processing data in a reactive augmented reality card game and a device for playing a reactive augmented reality card game, which are capable of process real-time mobile augmented reality processing through a mobile device having processing performance of relatively low specifications by reducing a load of the mobile device in implementing the mobile augmented reality of the method of processing data in a reactive augmented reality card game and device for playing a reactive augmented reality card game in which an augmented reality technology and a card battle game have been grafted.

Technical Solution

In order to achieve the objects, in one aspect, the present invention relates to a method of processing data in a reactive augmented reality card game based on the check of a collision between virtual objects, including a card photographing image reception step S110 of receiving a captured image of at least one card photographed by controlling image photographing of a photographing device, a card recognition step S120 of determining the type of at least one card by recognizing a printed image of the card printed on the card in the received captured image of the card, a card location/direction recognition step S130 of recognizing the location and direction of the at least one card based on the received captured image of the at least one card, a character augmented reality image display step S140 of fetching the 3D virtual object of a character assigned to the card whose type has been recognized, composing an augmented reality image of the character by mapping the fetched 3D virtual object of the character to the captured image of the card based on the location and direction of the card, and displaying the composed augmented reality image, a collider and lay setting step S150 of setting a collider which is the region of a predetermined location and size with respect to the 3D virtual object of the character and setting a lay which is a straight line having a predetermined length and direction, a collision sensing step S160 of determining whether the end point of the straight line of the lay has touched the region of the collider of the 3D virtual object of the character of a different card, and an animation execution step S170 of fetching an animation determined with respect to the 3D virtual object of the character and executing the animation. In this case, if it is determined that the end point of the straight line of the lay has touched the region of the collider of the 3D virtual object of the character of the different card in the collision sensing step S160, the animation execution step S170 includes fetching the predetermined animation, executing the animation, mapping the animation to the captured image of the card, and displaying the mapped image.

Preferably, the collider is a predetermined region including a portion of the 3D virtual object of the character, and the lay is a straight line having a predetermined length and direction and having a start point in a portion of the 3D virtual object of the character.

Furthermore, preferably, the method further includes a collision setting step S100 of setting the location and size of the collider of the 3D virtual object of the character of the at least one card and the start point, length and direction of the lay.

Furthermore, preferably, if it is determined that the end point of the lay has touched the collider of the 3D virtual object of the character of the different card, a capability variable of the character of the different card is fetched, and the play time of the animation is determined by comparing the fetched capability variable with a capability variable of the corresponding character.

In this case, it is preferred that the capability variable of the character of the different card is a physical strength variable, and the capability variable of the corresponding character is a striking power variable.

Furthermore, it is preferred that the animation fetched and executed if it is determined that the end point of the lay has touched the collider of the 3D virtual object of the character of the different card in the animation execution step S170 is an animation indicative of the attack action of the corresponding character.

Furthermore, it is preferred that the striking power variable of the capability variable of the corresponding character is subtracted from the physical strength variable of the capability variable of the character of the different card per predetermined time and the animation is executed until the subtracted value is a predetermined value or more.

In this case, preferably, the value of the striking power variable subtracted per predetermined time is increased or decreased by comparing attributes of the character of the corresponding card with attributes of the character of the different card.

Furthermore, the striking power variable of the capability variable of the corresponding character is subtracted per predetermined time, and the animation may be executed until the value of the subtracted striking power variable is a predetermined value or more.

In another aspect, the present invention relates to a device for playing a reactive augmented reality card game based on the check of a collision between virtual objects, including a photographing device control unit 210 photographing an image including at least one card by controlling a photographing device and generating and outputting a captured images of the photographed at least one card, a card image detection unit 220 processing the captured image of the at least one card, detecting a card image and an image printed on the card, and outputting the detected card image and printed image, a card recognition unit 230 recognizing the type of corresponding card by searching a previously stored card DB for the detected card image and outputting card information, a card tracking unit 240 computing location information of the card detected by processing the detected card image in real time and outputting the location information, an augmented reality processing unit 250 fetching the 3D virtual object of a character assigned to the card based on the card information received from the card recognition unit 230, composing an augmented reality image of the character by mapping the fetched 3D virtual object of the character to the captured image of the card based on the card location information received from the card tracking unit 240, and transmitting the composed augmented reality image to a display unit, and an animation control unit 260 setting a collider which is the region of a predetermined location and size with respect to the 3D virtual object of the character, setting a lay which is a straight line having a predetermined length and direction, determining whether the end point of the straight line of the lay has touched the region of a collider of the 3D virtual object of a character of a different card, and fetching the predetermined animation of the character based on a result of the determination. In this case, if it is determined that the end point of the straight line of the lay has touched the region of the collider of the 3D virtual object of the character of a different card, the animation control unit 260 fetches the predetermined animation of the character based on a result of the determination, transmits the fetched animation to the augmented reality processing unit 250, and controls the augmented reality processing unit 250 so that the fetched animation is mapped to the captured image of the card and executed.

Preferably, the card location information includes the location and direction of the corresponding card.

Furthermore, preferably, the collider is a predetermined region including a portion of the 3D virtual object of the character, and the lay is a straight line having a predetermined length and direction and having a start point in a portion of the 3D virtual object of the character.

Furthermore, preferably, the setting of the location and size of the collider of the 3D virtual object of the character and a start point, length and direction of the lay of the at least one card is received from a user.

Furthermore, preferably, if it is determined that the end point of the lay has touched the collider of the 3D virtual object of the character of the different card, a capability variable of the character of the different card is fetched, and the play time of the animation is determined by comparing the fetched capability variable with a capability variable of the corresponding character.

In this case, it is preferred that a capability variable of the character of the different card is a physical strength variable and a capability variable of the corresponding character is a striking power variable.

Preferably, an animation fetched and executed if it is determined that the end point of the lay has touched the collider of the 3D virtual object of the character of the different card is an animation indicative of the attack action of the corresponding character.

Furthermore, preferably, the lay is a straight line having a predetermined length and direction and having a start point in a portion of the card.

Advantageous Effects

In accordance with the present invention described above, there is an effect in that there can be provided the method of processing data in a reactive augmented reality card game and the device for playing a reactive augmented reality card game based on the check of a collision between virtual objects, which can efficiently processing an interaction action between characters that are composed and displayed on an augmented reality processing device.

Furthermore, the method of processing data in a reactive augmented reality card game and device for playing a reactive augmented reality card game based on the check of a collision between virtual objects according to the present invention can recognize various game situations in response to a change in the state of an actual card according to the progress of a card battle game and can process an animation reactively or dynamically by setting or resetting a capability variable, etc.

Furthermore, there is an effect in that real-time mobile augmented reality processing can be processed through a mobile device having processing performance of relatively low specifications by reducing a load of the mobile device in implementing the mobile augmented reality of the method of processing data in a reactive augmented reality card game and device for playing a reactive augmented reality card game in which an augmented reality technology and a card battle game have been grafted.

DESCRIPTION OF DRAWINGS

FIG. 1 is a diagram for illustrating the concept of the play device and play method of a reactive augmented reality card game according to the present invention.

FIG. 2 is a diagram for illustrating the structure of a card 10 used in the device for playing a reactive augmented reality card game according to the present invention.

FIG. 7 is a diagram for illustrating the data field of a DB within an App of an electronic device which is used in an embodiment of the present invention.

FIG. 8 is a diagram for illustrating an embodiment of a method of setting a collider and a lay according to the present invention.

BEST MODE FOR INVENTION

Figure 3:
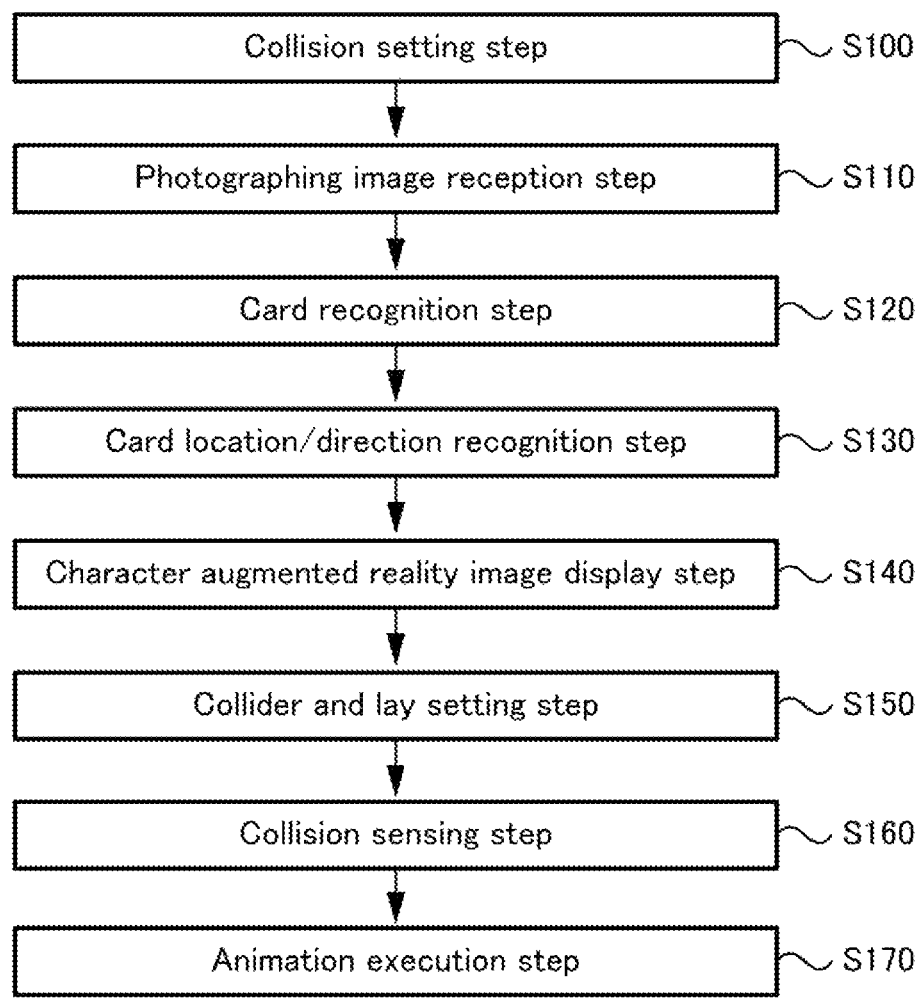
FIG. 3 is a flowchart of the method of processing data in a reactive augmented reality card game based on the check of a collision between virtual objects according to the present invention.

For the detailed description of the present invention described herein, reference is made to the accompanying drawings shown as specific embodiments in which the present invention may be practiced. The embodiments are described in detail in order for those skilled in the art to readily implement the present invention. It is to be understood that the various embodiments of the present invention are different, but do not need not to be exclusive. For example, a specific shape, structure and characteristic described herein may be implemented as another embodiment without departing from the spirit and scope of the present invention in connection with an embodiment. Furthermore, it is to be understood that the position or arrangement of an individual element within each disclosed embodiment may be changed without departing from the spirit and scope of the present invention. Accordingly, the detailed description hereinafter is not intended to have a limited meaning, but the scope of the present invention is restricted by only the attached claims along with all of ranges equivalent to the claims if it is appropriately described. Similar reference numerals are used to denote the same or similar functions throughout the drawings in various aspects.

Various embodiments of the present invention disclose the method of processing data in a reactive augmented reality card game and the device for playing a reactive augmented reality card game based on the check of a collision between virtual objects.

In this specification, the method of processing data in a reactive augmented reality card game and device for playing a reactive augmented reality card game based on the check of a collision between virtual objects are examples of a case implemented in the form of the configuration module of a general-purpose electronic device, such as a smart device, and an application installed in the configuration module. In some embodiments, they are not implemented as a general-purpose electronic device, such as a smart device, but may be configured as an independent dedicated device that implements the present invention.

Accordingly, the present invention may have elements larger than or less than the elements described and shown in the specification and drawings or may have the configuration of elements different from that described and shown in the specification and drawings. The described and shown several elements may be implemented by one or more pieces of signal processing and/or application-specific integrated circuits, hardware, software or a combination of hardware and software, and includes hardware and software related to the electronic device or a separate control unit (not shown) for controlling the hardware and software. If the described and shown several elements are implemented as one configuration module of a specific system, the control unit (not shown) may be implemented as a general-purpose or dedicated central processing unit of the corresponding system.

In this specification, a "card" is a common play card and implements the augmented reality of a card game, that is, functions as an object, that is, a target to be recognized or identified in a captured image for the mapping of a 3D virtual object.

A "printed image of a card" is an image printed on one surface of a card in order to visually identify the corresponding card, and includes character image and image information or text information that may be visually identified. The type of corresponding card is identified based on the character image and image information or text information. In an embodiment of this specification, a battle card on one surface of which information, such as a corresponding capability variable (for example, physical strength, striking power or defense power) and a character name, has been printed as a battle character image and image information or text information is illustratively described.

A "captured image of a card" means an image including at least one card, which has been photographed by a user through a photographing device control unit, such as the camera of a (general-purpose) electronic device such as a smart device, when a card game is played.

A "3D virtual object of a character" means a set of images (still images) or image data previously assigned to a card or the character of the card so that the images or image data is mapped to the card identified through the "printed image of the card" or a type to which the corresponding card belongs to form an augmented reality image of the character. The 3D virtual object of a character is used as a concept including a static image or video and a dynamic image and/or a moving image.

An "animation" means a set of instructions or data for giving an animation effect to a moving image or 3D virtual object predetermined with respect to the 3D virtual object of a character.

A "collider" or the region of a "collider" means the range of data for the pixels of an image defined as the region of a predetermined location and size with respect to the 3D virtual object of a character. A "lay" is a straight line having a predetermined length and direction and is implemented as a distance calculation function having a start point, length and direction with respect to the pixels of an image. A "collider" and a "lay" are defined and set with respect to image data converted into pixels.

The "satisfaction of a collision condition" or "a touch on the collider region of a lay" means that part of or the end point of a "lay" defined in the pixel data of an image is within the range of data for the pixels of a "collider" or the state in which part of or the end point of a "lay" is within the range of the data. This is interchangeably used with a term "collision sensing."

Hereinafter, the method of processing data in a reactive augmented reality card game and device for playing a reactive augmented reality card game based on the check of a collision between virtual objects according to the present invention are described in connection with embodiments with reference to the accompanying drawings.

FIG. 1 is a diagram for illustrating the concept of the play device and play method of a reactive augmented reality card game according to the present invention.

A progress form of a common card game is implemented as a situation in which the character of a player, that is, a main character, confronts the character of a relative party (counterpart) in the display of a game play device as if the card of a main player confronts the card of a relative party (counterpart) offline.

In contrast, the play device and play method of a reactive augmented reality card game according to the present invention are implemented in the following form. Characters assigned to respective cards are objected. If the interaction reaction of each of the objected characters satisfies a specific condition, that is, a collision condition, each of the objected characters is driven and implemented in the game play device. For example, if the play of an animation predetermined with respect to the 3D virtual object of each character satisfies a specific condition with respect to each character, each of the objected characters is driven.

To this end, at least one card 10 and the electronic device 20 of the present invention are configured to have the following basic characteristics.

Referring to FIG. 1, the reactive augmented reality card game to which the present invention is applied is basically a play card, and includes a character image and image information or text information that may be visually identified on one surface thereof. A user plays the card game using the at least one card 10 having a printed image. In the present invention, an image including the at least one card 10 is captured through the photographing device of the electronic device 20, such as a smart device, while playing the game. Printed images of the cards are recognized from the one or more captured images, and the types of cards are determined using the printed images. The 3D virtual objects of characters 30 assigned to the cards are fetched and mapped to the predetermined captured image. Augmented reality images of the characters are displayed on the display of the electronic device 20, such as a smart device, in real time.

In the present invention, in accordance with the method of processing data in a reactive augmented reality card game based on the check of a collision between characteristic virtual objects, when the location and direction of the card 10 changed by a user are set or changed in the actual play process of the card game, collision sensing for determining whether a collision condition is satisfied is independently performed by the 3D virtual object of the character 30 that has been assigned to each card 10 and printed. If a collision is sensed, an animation predetermined with respect to the 3D virtual object of the character 30 displayed on the display of the electronic device 20 is fetched. The fetched animation is mapped to the captured image of the card and played. In the present embodiment, the device for playing a reactive augmented reality card game of the present invention is implemented in a form in which the hardware elements of a smart device and an application installed in the smart device are combined as a general-purpose electronic device.

FIG. 2 is a diagram for illustrating the structure of the card 10 used in the device for playing a reactive augmented reality card game of the present invention. Referring to FIG. 2, the card 10 of the present embodiment includes a plurality of common battle cards 1, 2, . . . , N used in a common match-up card game to battle card game. Different images image1, image2, image3 , . . . , imageN are printed on the respective cards. A character image to identify the type of each card, capability information such as physical strength, striking power and defense power, and a character name Bull are printed in each printed image in an image or text form.

The attributes (for example, water, a fire and wind) of a character are not printed and are stored and managed by a separate electronic device. Accordingly, a user who performs the card game cannot be aware of attribute information through a card image.

FIG. 3 is a flowchart of the method of processing data in a reactive augmented reality card game based on the check of a collision between virtual objects according to the present invention.

Referring to FIG. 3, in the method of processing data in a reactive augmented reality card game based on the check of a collision between virtual objects according to the present invention, a photographing image reception step S110, a card recognition step S120, a card location/direction recognition step S130, a character augmented reality image display step S140, a collider and lay setting step S150, a collision sensing step S160, and an animation execution step S170 are basically performed, so play is performed by mapping a predetermined animation to a captured image of a card with respect to the 3D virtual object of the character 30 displayed on the display.

In the photographing image reception step S110, a captured image of the at least one card photographed by controlling the image photographing of the photographing device is received. The photographing image reception step S110 is performed by a photographing device control unit 210 of FIG. 4.

In the card recognition step S120, the type of the at least one card is determined by recognizing a printed image of the card printed on the card in the received captured image of the at least one card. The card recognition step S120 may be performed in such a manner that a card image detection unit 220 of FIG. 4 to be described later extracts an image of the at least one card except a background from the captured image, and a card recognition unit 230 recognizes the corresponding card in such a way as to compare the extracted image with each of images (a card1, a card2, a card3, . . . ,) stored in a card DB 231 in association with identification information of respective cards and to output information of a card having the extracted card image. A method of comparing each of the stored images with the extracted card image may be performed in such a way as to extract the feature points of the extracted card image and to compare the feature points of the card image with the feature points of each of the images (the card1, the card2, the card3, . . . ,) stored in associated with the identification information of the respective cards. A process of extracting the feature points of an image and determining the identity of images is implemented in accordance with various common image recognition methods.

The entire image printed on the card may be used as a card image, that is, a target of extraction and recognition. In the present embodiment, an image of a character printed on a card is extracted as a card image and used.

Figure 4:
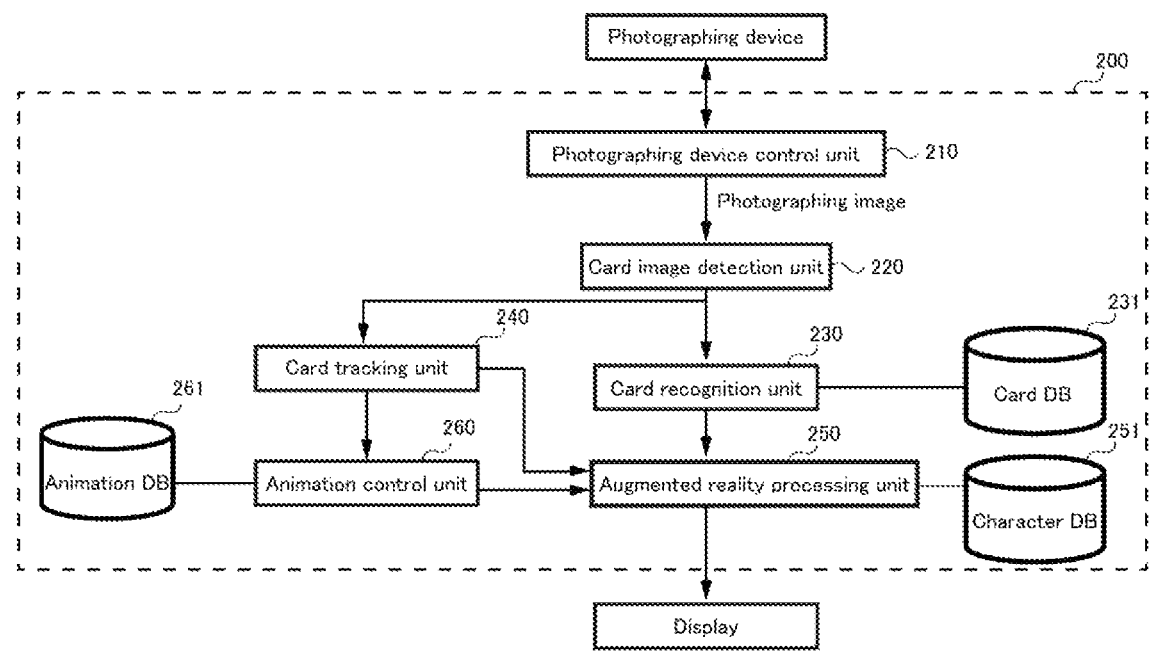
FIG. 4 shows the configuration of the device for playing a reactive augmented reality card game of the present invention.

The card location/direction recognition step S130 is a process of recognizing the location and direction of the at least one card based on the received captured image of the at least one card, and is performed by a card tracking unit 240 of FIG. 4. The entire extracted and printed image or an image of a character printed on the card may be extracted as a card image and used an image of the card whose location and direction are to be recognized. Only the contour of the card image may be used.

If the characteristics of a card having a typical shape, for example, a rectangular shape having a predetermined size and shape are taken into consideration, it is more preferable to recognize the location and direction of the card using the contour of an extracted and recognized card image in order to improve the accuracy of recognition in the location and direction of the card and to a load used therefor.

The character augmented reality image display step 140 is a process of fetching the 3D virtual object of a character assigned to the card whose type has been recognized, composing an augmented reality image of the character by mapping the fetched 3D virtual object of the character to the captured image of the card based on the location and direction of the card, and displaying the composed augmented reality image, and is performed by an augmented reality processing unit 250 of FIG. 4. The 3D virtual object of a character assigned to a specific card stored in a character DB 251 is fetched and used.

The collider and lay setting step S150 is a process of setting a collider, that is, the region of a predetermined location and size, with respect to the 3D virtual object of the character and setting a lay, that is, a straight line having a predetermined length and direction, and is performed by an animation control unit 260 of FIG. 4.

The collider may be defined and set as a predetermined region including part of the 3D virtual object of the character 30 or a region including the entire 3D virtual object of the character 30. In some embodiments, one or more colliding bodies may be set with respect to the 3D virtual object of the character 30.

The lay may be defined as a straight line having a predetermined length and direction and having a start point in a portion of the 3D virtual object of the character. Furthermore, in some embodiments, the lay may be defined and set as a straight line having a predetermined length and direction and having a start point in a portion of the card.

Accordingly, the present invention may further include a collision setting step S100 of setting the location and size of the collider of the 3D virtual object of the character 30 of the at least one card and the start point, length and direction of the lay prior to the photographing image reception step S110.

The collision sensing step S160 is a process of determining whether the end point of the straight line of the lay has touched the region of the collider of the 3D virtual object of the character of another card, and is performed by the animation control unit 260 of FIG. 4.

The animation execution step S170 is a process of fetching an animation predetermined with respect to the 3D virtual object of the character and executing the fetched animation, and is performed by the augmented reality processing unit 250 of FIG. 4 under the control of the animation control unit 260 of FIG. 4. If it is determined that the end point of the straight line of the lay has touched the region of the collider of the 3D virtual object of the character of another card in the collision sensing step $160, the predetermined animation is fetched, executed, mapped to the captured image of the card, and displayed.

The play time of the animation, obtained by fetching the capability variable of the character of another card if it is determined that the end point of the lay has touched the collider of the 3D virtual object of the character of another card and comparing the fetched capability variable with the capability variable of a corresponding character, may be determined to be the play time of the animation.

For example, if the capability variable of the character of another card is a physical strength variable and the capability variable of a corresponding character is a striking power variable, the striking power variable of a capability variable of the corresponding character is subtracted from the physical strength variable of a capability variable of the character of another card per predetermined time, and the animation is executed until the subtracted value of the physical strength variable becomes a predetermined value or more. In the present embodiment, the predetermined value is set to 0 so that the animation is executed until the subtracted value of the physical strength variable becomes 0.

Meanwhile, the amount of the deduction of the physical strength variable per time, that is, a capability variable of the character of another card, may be controlled by comparing the attributes of the character of a corresponding card, for example, water, a fire, and wind with the attributes of the character of another card and increasing or decreasing the value of the striking power variable subtracted per predetermined time, that is, striking power/Sec.

For example, if the attributes of the character of a corresponding card that plays an attack animation are superior to the attributes of another card, the attack animation is played for a short time by increasing the value of the striking power variable subtracted per time, that is, the striking power/Sec. If the attributes of the character of a corresponding card are not superior to the attributes of another card, the attack animation is played for a long time by decreasing the striking power/Sec.

Whether the attributes are superior or not are previously set in order of fire<water<wind<fire<water, . . . , for example, and stored in an electronic device.

Meanwhile, in some embodiments, if the attributes of the character of a corresponding card are not superior, the striking power variable of a capability variable of the corresponding character may be subtracted per predetermined time, and the animation may be executed until the subtracted value of the striking power variable becomes a predetermined value or more. As described above, an animation execution time may be previously set or adjusted in various manners using the value of a capability variable and the attributes.

As described above, the play time of the animation of a corresponding character may be determined using a method of comparing capability variables, such as comparing the physical strength variable of another card with the striking power variable of a corresponding card.

If the present invention is applied to a battle game, an animation indicative of the attack action of a corresponding character may be used as the animation fetched and executed if it is determined that the end point of the lay has touched the collider of the 3D virtual object of the character of another card in the animation execution step S170.

A detailed method of implementing the method of processing data in a reactive augmented reality card game based on the check of a collision between virtual objects according to the present invention is described below with reference to embodiments of the following drawings.

Figure 5:
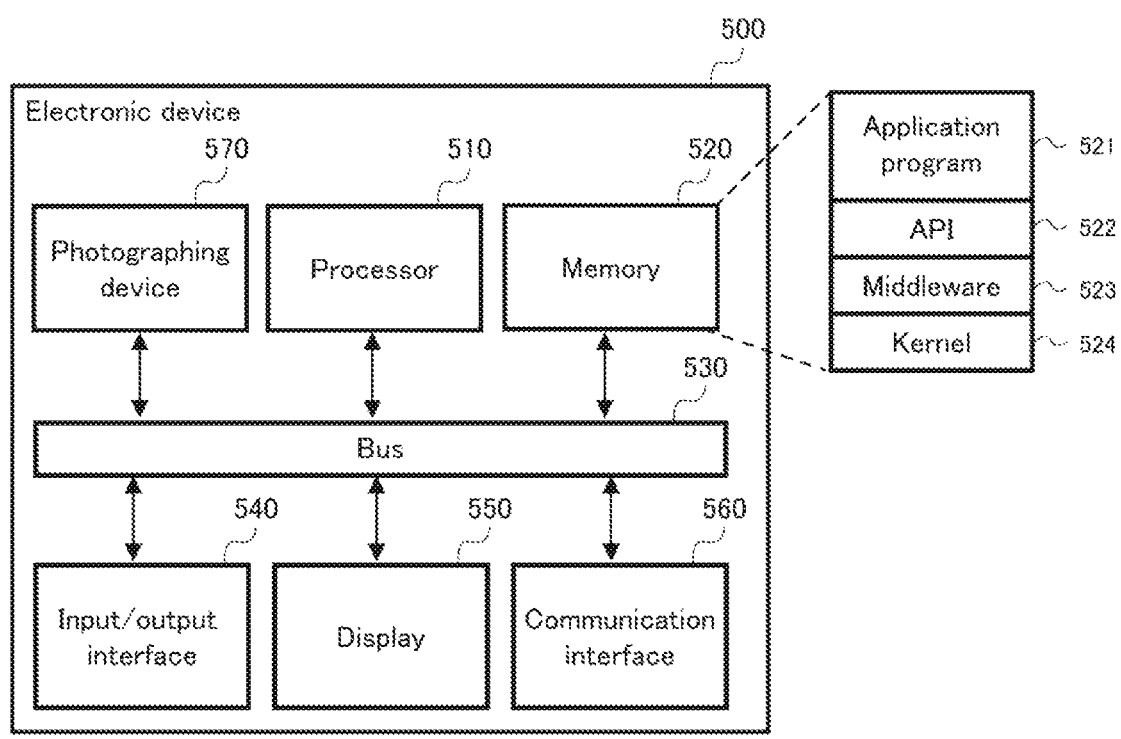
FIG. 5 shows a configuration in which the device for playing a reactive augmented reality card game of the present invention has been implemented in a portable electronic device, such as a smart device.

FIG. 4 shows the configuration of the device for playing a reactive augmented reality card game of the present invention. FIG. 5 shows a configuration in which the device for playing a reactive augmented reality card game of the present invention has been implemented in a portable electronic device, such as a smart device.

The method of processing data in a reactive augmented reality card game based on the check of a collision between virtual objects according to the present invention is implemented by the device for playing a reactive augmented reality card game of FIG. 4. The system of FIG. 4 may be implemented as a portable electronic device, such as a smart device.

Referring to FIG. 4, the play device 200 of the reactive augmented reality card game of the present invention implements an interaction between 3D virtual objects based on the check of a collision between the virtual objects in an electronic device basically including a photographing device, such as a camera, and a display. The play device 200 includes the photographing device control unit 210, the card image detection unit 220, the card recognition unit 230, the card tracking unit 240, the augmented reality processing unit 250, and the animation control unit 260, and includes the card DB 231, the character DB 251 and an animation DB 261.

The photographing device control unit 210 functions to photograph an image including at least one card by controlling the photographing device and to generate and output a captured images of the photographed at least one card.

The card image detection unit 220 processes the captured image of the at least one card, detects and outputs the card image and an image printed on the card, extracts only at least one card image except a background from the captured image, and transmits the extracted card image to the card recognition unit 230.

The card recognition unit 230 recognizes the type of corresponding card by searching the previously stored card DB 231 for the detected card image, and outputs the card information. The card recognition unit 230 recognizes a corresponding card in such a way as to compare at least one card image received from the card image detection unit 220 with each of images (a card1, a card2, a card3, . . . ,) stored in the card DB 231 in association with the identifiers of respective cards and to output information of a card having the extracted card image. A method of comparing each of the stored images with the extracted card image may be performed in such a way as to extract the feature points of the extracted card image and to compare the feature points of the card image with the feature points of each of the images (the card1, the card2, the card3, . . . ,) stored in associated with the identification information of the respective cards. A process of extracting the feature points of an image and determining the identity of images is implemented in accordance with various common image recognition methods.

The card tracking unit 240 computes location information of the card detected by processing the detected card image in real time, outputs the computed location information, and tracks the location of the card. The location information includes information about the location and direction of each card. In the tracking method, a change in the location of each card is tracked in such a way as to calculate the three-dimensional location values (x, y and z values) of at least one card. The changed location information is transmitted to the augmented reality processing unit 250 in real time.

The calculation of the three-dimensional location values may be performed by comparing the color values of the respective pixels of a card image or comparing feature points thereof, may be performed through a change value between them, or may be performed by extracting the contour of an extracted and recognized card image by taking into consideration the characteristics of a card having a typical shape, for example, a rectangular shape having a predetermined size and shape and comparing the contour with the rectangular shape of a previously stored card, for example, a shape, such as the size and slope.

Even in the tracking of a change in the location of the card, the entire card image, that is, a target, is not used, but only the feature point information of the card image may be used. Furthermore, in some embodiments, card location information includes the slope value of a recognized card calculated based on three-dimensional location values in addition to the three-dimensional location values of the card calculated from a card image. The direction of the card may be computed based on the slope value.

The calculation of the slope value may be performed by comparing the color values of the respective pixels of a card image or comparing feature points thereof, may be performed through a change value between them, or may be performed by extracting the contour of an extracted and recognized card image by taking into consideration the characteristics of a card having a typical shape, for example, a rectangular shape having a predetermined size and shape and comparing the contour with the rectangular shape of a previously stored card, for example, a shape, such as the size and slope.

The entire extracted and printed image or an image of a character printed on the card may be extracted as the card image and used. Only the contour of the card image may be used. If the characteristics of a card having a typical shape, for example, a rectangular shape having a predetermined size and shape are taken into consideration, it is more preferable to recognize the location and direction of the card using the contour of an extracted and recognized card image in order to improve the accuracy of recognition in the location and direction of the card and to a load used therefor.

The augmented reality processing unit 250 fetches the 3D virtual object of a character assigned to the card from the character DB 251 based on the card information received from the card recognition unit 230, composes an augmented reality image of the character by mapping the fetched 3D virtual object of the character to the captured image of the card based on the card location information received from the card tracking unit 240, and transmits the composed augmented reality image to the display unit. The display unit displays the augmented reality image of the character in which the 3D virtual object of the character has been composed with the captured image.

The animation control unit 260 functions to set a collider, that is, the region of a predetermined location and size, with respect to the 3D virtual object of the character, to set a lay, that is, a straight line having a predetermined length and direction, to determine whether the end point of the straight line of the lay has touched the region of the collider of the 3D virtual object of the character of another card, and to fetch the predetermined animation of the character based on a result of the determination.

If it is determined that the end point of the straight line of the lay has touched the region of the collider of the 3D virtual object of the character of another card, the animation control unit 260 fetches the predetermined animation of the character from the animation DB 261 based on a result of the determination, transmits the fetched animation to the augmented reality processing unit 250, and controls the augmented reality processing unit 250 so that the fetched animation is mapped to the captured image of the card and executed. The augmented reality processing unit 250 maps the animation of the character to the captured image of the card, plays the animation, and transmits the playing animation to the display unit. The display unit displays an augmented reality image in which the animation of the character being played has been composed with the captured image.

In this case, the transmitted animation may be a predetermined moving image with respect to the 3D virtual object of the character. In some embodiments, the transmitted animation means a set of instructions or data for giving an animation effect to the 3D virtual object.

The device for playing a reactive augmented reality card game of the present invention is a general-purpose electronic device and may be implemented in a form in which the hardware configuration of a smart device and an application installed therein have been combined. FIG. 5 shows a configuration in which the device for playing a reactive augmented reality card game of the present invention has been implemented in a portable electronic device, such as a smart device.

Referring to FIG. 5, a smart device 500, that is, the device for playing a reactive augmented reality card game of the present invention, may include at least one of a processor 510, memory 520, a bus 530, an input/output interface 540, a display 550, a communication interface 560 and a camera 570. In some embodiments, the smart device 500 may omit at least one of the elements or may additionally include another element.

The bus 530 may include a circuit that connects the elements 510 to 570, for example, and that transfers communication (e.g., a control message and/or data) between the elements.

The processor 510 may include one or more of a central processing unit (CPU), an application processor (AP) and a communication processor (CP). The processor 510 may execute operation or data processing regarding control and/or communication of at least one different element of the smart device 500, for example.

The memory 520 may include volatile and/or non-volatile memory. The memory 520 may store an instruction or data related to at least one different element of the smart device 500, for example. In accordance with one embodiment, the memory 520 may store software and/or a program. The program may include, for example, a kernel 524, middleware 523, an application programming interface (API) 522 and/or an application program (or "application") 521. At least some of the kernel 524, the middleware 523 and the API 522 may be called an operating system (OS).

The kernel 524 may control or manage system resources (e.g., the bus 530, the processor 510 and the memory 520) used to execute operations or functions implemented in other programs (e.g., the middleware 523, the API 522 and the application program 521), for example. Furthermore, the kernel 524 may provide an interface capable of controlling or managing the system resources by accessing the elements of the smart device 500 in the middleware 523, the API 522 or the application program 521.

The middleware 523 may act as an intermediary so that the API 522 or the application program 521, for example, exchanges data with the kernel 524. Furthermore, the middleware 523 may perform control (e.g., scheduling or load balancing) on a task request using a method, such as assigning priority by which the system resources (e.g., the bus 530, the processor 510 or the memory 520) of the smart device 500 can be used to at least one application of the application program 521, for example, in relation to task requests received from the application program 521.

The API 522 is an interface through which, for example, the application 521 controls a function provided by the kernel 524 or the middleware 523, and may include, for example, at least one interface or function (e.g., instruction) for file control, window control, image processing or text control.

The input/output interface 540 may act as an interface capable of transferring a command or data received from a user or another external device, for example, to other element(s) of the smart device 500. Furthermore, the input/output interface 540 may output a command or data, received from other element(s) of the smart device 500, to a user or another external device.

The display 550 may include, for example, a liquid crystal display (LCD), a light-emitting diode (LED) display, an organic light-emitting diode (OLED) display, a microelectromechanical systems (MEMS) display or an electronic paper display. The display 550 may display a variety of types of content (e.g., text, an image, video, an icon or a symbol), for example, to a user. The display 550 may include a touch screen, and may receive a touch, gesture, proximity or hovering input using an electronic pen or part of a user, for example.

The communication interface 560 may set communication between the smart device 500 and an external device (a management server 130), for example. For example, the communication interface 560 is connected to a telecommunications network through wireless communication or wired communication, and may communicate with the external device.

The wireless communication is a cellular communication protocol, for example, and may use at least one of LTE, LTE-A, CDMA, WCDMA, UMTS, WiBro and GSM, for example. The wired communication may include at least one of a universal serial bus (USB), a high definition multimedia interface (HDMI), a recommended standard 232 (RS-232) and a plain old telephone service (POTS), for example. The telecommunications network may include at least one of a computer network (e.g., a LAN or a WAN), the Internet and a telephone network, for example.

Figure 6:
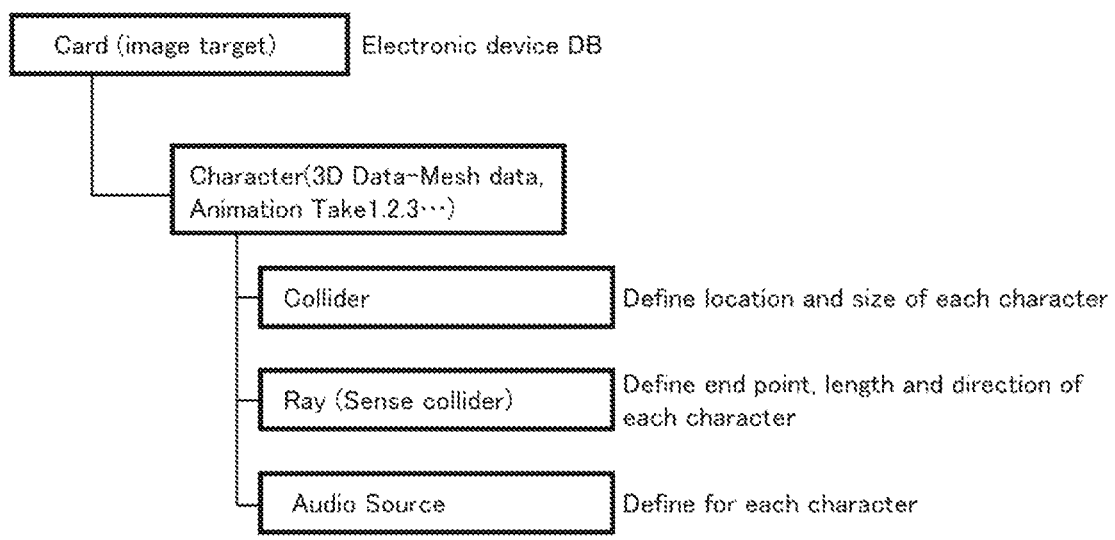
FIG. 6 is a diagram for illustrating the hierarchical structure of data used in an embodiment of the present invention.

FIG. 6 is a diagram for illustrating the hierarchical structure of data used in an embodiment of the present invention. FIG. 7 is a diagram for illustrating the data field of a DB within an App of the electronic device used in an embodiment of the present invention.

Data used in the present invention is stored in the DB (not shown) of the electronic device or the DB of an application installed in the electronic device. Referring to FIG. 6, the 3D virtual object data of a character, animation-related data and attributes associated with a card are classified depending on the type of card, associated and stored in the lower of an image, that is, a target of image tracking, in the form of the card (image target). The location and size of a collider are defined for each character as the attributes of the 3D virtual object data and animation data. The start point, length and direction of the lay are defined for each character. An audio source played back along with 3D virtual object data and animation is defined and stored.

Referring to FIG. 7, the card images (the card1, the card2, the card3, . . . ,) assigned depending on the type of card and to be identified are stored in the aforementioned card DB 231 based on the identifiers (not shown) of the cards. The identifiers of the 3D virtual objects of the characters that are previously set and associated with the card images are stored in the card DB 231.

The aforementioned character DB 251 stores the 3D virtual objects of respective characters assigned in association with respective cards and links (a character1, a character2, a character3, . . . ,) for fetching the 3D virtual objects, and stores, such as physical strength variables (HP1, HP2, HP3, . . . ,) and striking power variables (ATTACK1, ATTACK2, ATTACK3, . . . ,), that is, the capability variables of the respective characters and the attributes (water, a fire, and wind, . . . ) and attack intervals (INTERVAL1, INTERVAL2, INTERVAL3, . . . ,) of the respective characters.

One or more animations assigned to the 3D virtual objects of respective characters are classified by the 3D virtual objects (the character1, the character2, the character3, . . . ,)

of the respective characters in standby states (a standby operation1, a standby operation2, a dash action3, . . . ,), attack states (an attack action1, an attack action2, an attack action3, . . . ,), and a stop state (a stop action1, a stop action2, a stop action3, . . . ,) and are stored in The aforementioned animation DB 261.

Figure 9:
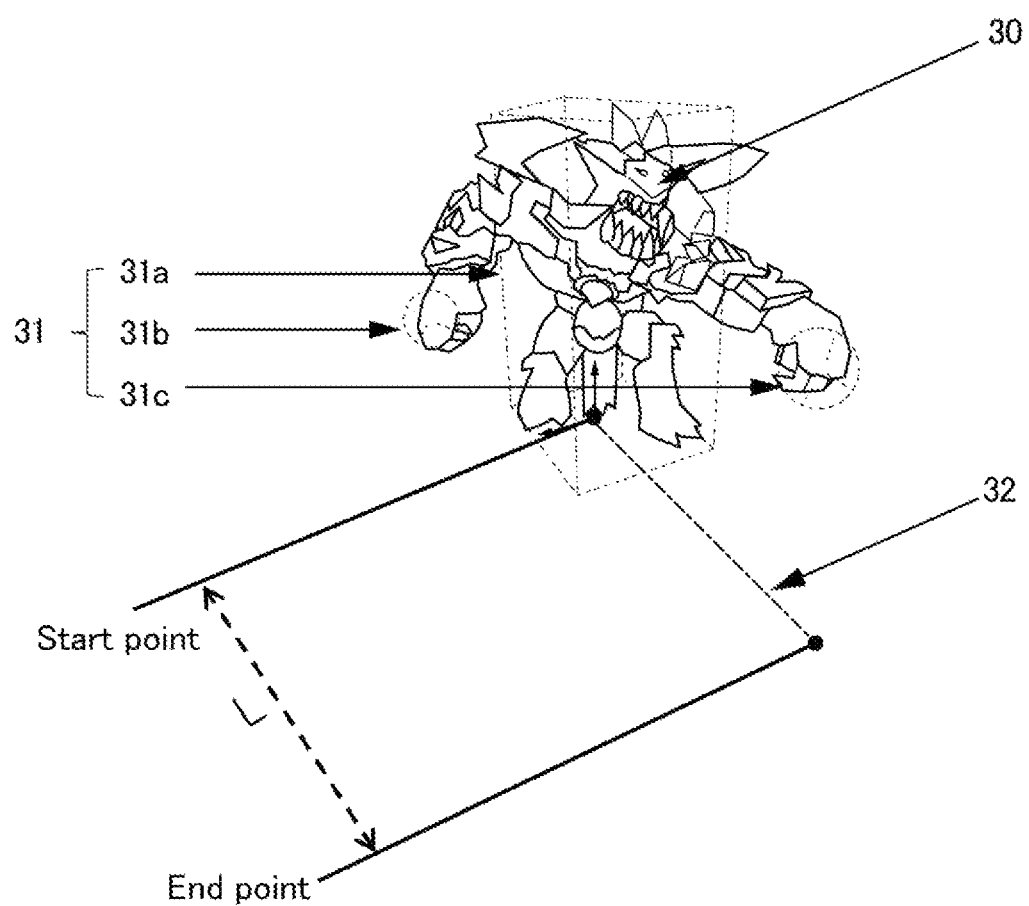
FIG. 9 is a diagram for illustrating the structure of the set 3D virtual objects of a plurality of colliding bodies and a lay with respect to a character according to an embodiment of the present invention.
Figure 10:
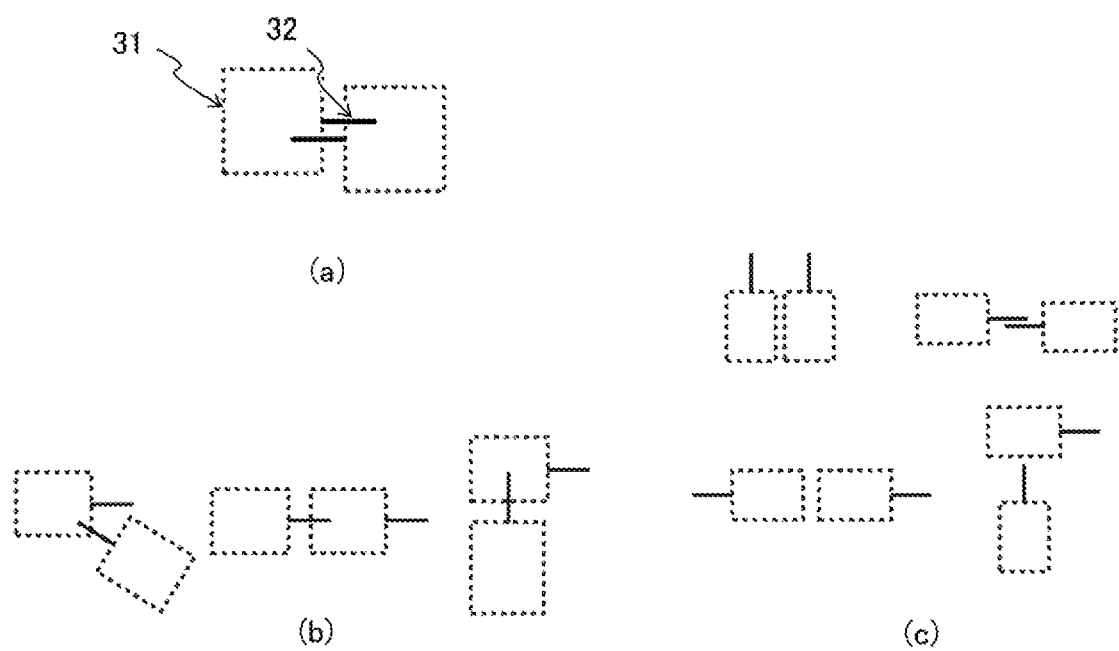
FIG. 10 is a diagram for illustrating the principle that a collision by a collider and lay in the relative location direction of the 3D virtual object of a character according to an embodiment of the present invention is recognized.

FIG. 8 is a diagram for illustrating an embodiment of a method of setting the collider and the lay according to the present invention. FIG. 9 is a diagram for illustrating the structure of the set 3D virtual objects of a plurality of colliding bodies and a lay with respect to a character according to an embodiment of the present invention. FIG. 10 is a diagram for illustrating the principle that a collision by a collider and lay in the relative location direction of the 3D virtual object of a character according to an embodiment of the present invention is recognized.

Referring to FIGS. 8 and 9, the aforementioned collider and region of the collider of the present invention mean the range of data for the pixels of an image defined as the region of a predetermined location and size with respect to the 3D virtual object of a character. The lay is a straight line having a predetermined length and direction, and may be implemented as a distance calculation function having a start point, length and direction with respect to the pixels of an image, may be defined with respect to image data converted into pixels, and may be set in various manners.

FIG. 8 illustrates a case where the collider or the region of the collider has been set as a predetermined region including the entire 3D virtual object of a character.

Meanwhile, FIG. 8(*a*) illustrates a case where the lay has been set as a straight line having a predetermined length and direction and having a start point in a portion of the 3D virtual object of the character. The embodiment of FIG. 8(*b*) illustrates a case where the lay has been set as a straight line having a predetermined length and direction and having a start point in a portion of the card.

FIG. 9 illustrates a case where a plurality of colliding bodies or the regions of the colliding bodies have been set as a plurality of predetermined regions including a portion of the 3D virtual object of a character.

Accordingly, the present invention can be optimized and applied to various game environments because the locations and sizes of the colliding bodies of the 3D virtual objects of the characters of the one or more cards and the start point, length and direction of the lay can be set.

Referring to FIG. 10, if a collision condition is satisfied, that is, if a touch on the collider region of a lay is generated, it means the state in which a portion or the end point of the lay defined in the pixel data of an image falls within the range of data for the pixels of a collider or is within a corresponding range. The animation control unit 260 determines that the end point of the straight line of the lay has touched the region of the collider of the 3D virtual object of the character of another card by detecting the collision condition, that is, performing a collision sensing function, fetches the predetermined animation of the character, and transmits the fetched animation to the augmented reality processing unit 250. Accordingly, various cases in which the collision condition has been satisfied can be set by performing collision sensing.

FIG. 10(*a*) corresponds to a case where both the 3D virtual objects of the characters of cards on both sides satisfy a collision condition in the locations and directions of the cards. Both animations predetermined with respect to the 3D virtual objects of the characters of both cards are fetched, executed, mapped to captured images of the cards, and displayed.

FIG. 10(*b*) corresponds to a case where only the 3D virtual object of the character of only one card satisfies a collision condition in the location and direction of the card. An animation predetermined with respect to the 3D virtual object of the character of the card that has satisfied the collision condition is fetched, executed, mapped to a captured image of the card that has satisfied the collision condition, and displayed.

FIG. 10(*c*) corresponds to a case where both the 3D virtual objects of the characters of two cards do not satisfy a collision condition. Both animations are not fetched or executed with respect to the 3D virtual objects of the characters of the two cards.

Figure 11:
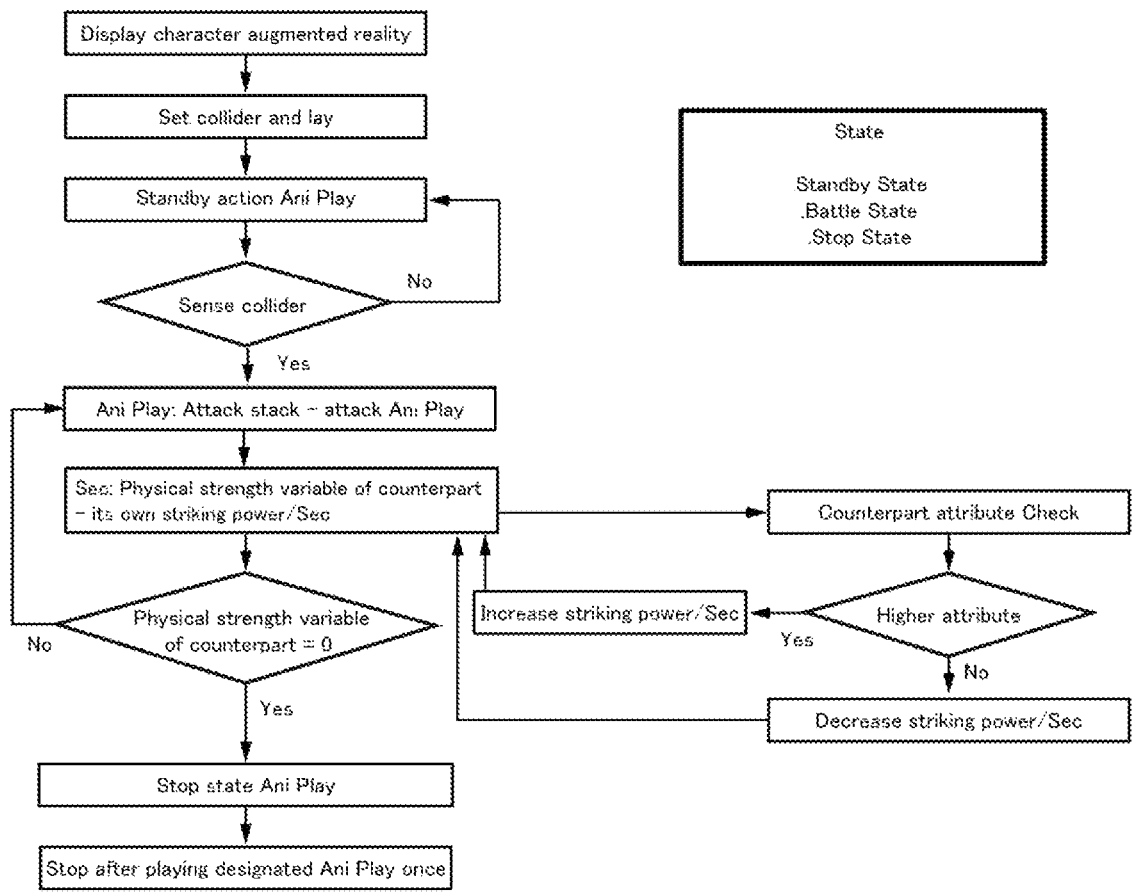
FIG. 11 is a detailed flowchart of an animation display process according to an embodiment of the present invention.

FIG. 11 is a detailed flowchart of an animation display process according to an embodiment of the present invention.

In the present invention, the execution time of the animation is determined based on a capability variable of a character predetermined as a factor of a battle game. If a touch on a collider is determined, a capability variable of the character of another card is fetched. The play time of the animation is determined by comparing the fetched capability variable of the character of another card with a capability variable of a corresponding character.

In the present embodiment, the physical strength variable is used as the capability variable of the character of another card, the striking power variable is used the capability variable of the corresponding character, and the play time of the animation. In this case, whether the attributes (water, a fire, wind, etc.) of a card are superior is taken into consideration, and an animation indicative of the attack action of a corresponding character is used as the animation that is fetched and executed.

In the present embodiment, if the capability variable of the character of another card is the physical strength variable and the capability variable of the corresponding character is the striking power variable, the striking power variable of the capability variable of the corresponding character is subtracted from the physical strength variable of the capability variable of the character of another card per predetermined time. The animation is executed until the subtracted value of the physical strength variable becomes a predetermined value or more. The present embodiment corresponds to a case where a predetermined value has been set to 0 so that the animation is executed until the subtracted value of the physical strength variable becomes 0.

In this case, the amount of deduction of a capability variable of the character of another card per time may be controlled by comparing the attributes of the character of a corresponding card, for example, water, a fire, and wind with the attributes of the character of another card and increasing or decreasing the value of the striking power variable subtracted per predetermined time, that is, the striking power/Sec.

For example, if the attributes of the character of a corresponding card that plays an attack animation are superior to the attributes of another card, the attack animation is played for a short time by increasing the value of the striking power variable subtracted per time, that is, the striking power/Sec. If the attributes of the character of a corresponding card are not superior to the attributes of another card, the attack animation is played for a long time by decreasing the striking power/Sec.

Meanwhile, in some embodiments, if the attributes of the character of a corresponding card are not superior, the striking power variable of a capability variable of the corresponding character may be subtracted per predetermined time, and the animation may be executed until the subtracted value of the striking power variable becomes a predetermined value or more.

As described above, a game factor can be maximized by determining the play time of the animation of a corresponding character in such a way as to compare capability variables, such as the physical strength variable of another card and the striking power variable of a corresponding card.

Referring to FIG. 11, in the present embodiment, when the augmented reality image of the character is displayed in the character augmented reality image display step S140 and the collider and the lay are set in the collider and lay setting step S150, a standby operation animation is executed in the 3D virtual object of the character. In some embodiments, the execution of the standby operation animation may be substituted with the continuous display of an augmented reality image of a 3D virtual object.

Collision sensing is repeatedly performed using a collision sensing method of determining whether the end point of the straight line of the lay has touched the region of the collider of the 3D virtual object of the character of another card in the aforementioned collision sensing step S160.

Next, when a collision is sensed, the 3D virtual object of the character changes to the attack state, and thus an animation "attack Ani" indicative of the attack action of the corresponding character is executed. The value of the striking power variable of the character of a corresponding card per time (striking power/Sec) is subtracted from the physical strength variable of a counterpart character every second. This continues until the physical strength variable of the counterpart becomes 0. When the physical strength variable of the counterpart reaches 0, the 3D virtual object of the character changes to the stop state, the execution of the animation "attack Ani" indicative of the attack action is stopped, and the animation in the stop state is played. A subsequently designated animation (for example, an animation indicating victory) is played once and terminated. In this case, in the battle game, the character of the corresponding card is indicated to have a win.

Meanwhile, a process of checking the attributes of the counterpart when the value of the striking power variable of the character of the corresponding card per time (striking power/Sec) is subtracted from the physical strength variable of the counterpart character is further included. If the attributes of the corresponding card are superior to the attributes of the counterpart in the process of checking the attributes of the counterpart, the value of the striking power variable of the character of the corresponding card per time (striking power/Sec) may be raised, so the execution time of the animation "attack Ani" indicating the attack action may be reduced. If the attributes of the corresponding card are not superior to the attributes of the counterpart, the value of the striking power variable of the character per time (striking power/Sec) is reduced, so the execution time of the animation "attack Ani" indicative of the attack action may be increased.

As described above, while the present invention has been described in conjunction with specific contents, such as specific elements, and the limited embodiments and diagrams above, they are merely provided to help general understanding of the present invention and the present invention is not limited to the embodiments. A person having ordinary skill in the art to which the present invention pertains may change and modify the present invention in various manners based on the foregoing description.

Accordingly, the technological spirit of the present invention should not be determined based on only the described embodiments, and the following claims and all of equal or equivalent changes to the claims should be construed as belonging to the category of the spirit of the present invention.

DESCRIPTION OF REFERENCE NUMERALS

10: card 20: electronic device
30: 3D virtual object of character 210: photographing device control unit
220: card image detection unit 230: card recognition unit
240: card tracking unit 250: augmented reality processing unit
260: animation control unit

The invention claimed is:

1. A method of processing data in a reactive augmented reality card game based on a check of a collision between virtual objects, the method comprising:
    receiving a captured image of at least one card photographed by controlling image photographing of a photographing device,
    determining a type of the at least one card by recognizing a printed image of the card printed on the card in the received captured image of the card,
    recognizing a location and direction of the at least one card based on the received captured image of the at least one card,
    fetching a 3D virtual object of a character assigned to the card whose type has been recognized, composing an augmented reality image of the character by mapping the fetched 3D virtual object of the character to the captured image of the card based on the location and direction of the card, and displaying the composed augmented reality image,
    setting a collider which is a region of a predetermined location and size with respect to the 3D virtual object of the character and setting a lay which is a straight line having a predetermined length and direction,
    determining whether an end point of the straight line of the lay has touched a region of the collider of the 3D virtual object of the character of a different card, and
    fetching an animation predetermined with respect to the 3D virtual object of the character and executing the animation,
    wherein when the end point of the straight line of the lay has touched the region of the collider of the 3D virtual object of the character of the different card then the fetching the animation step comprises fetching the animation, executing the animation, mapping the animation to the captured image of the card, and displaying the mapped image.

2. The method of claim 1, wherein:
    the collider is a predetermined region comprising a portion of the 3D virtual object of the character, and
    the lay is a straight line having a predetermined length and direction and having a start point in a portion of the 3D virtual object of the character.

3. The method of claim 1, further comprising setting the location and size of the collider of the 3D virtual object of the character of the at least one card and a start point, length and direction of the lay.

4. The method of claim 1, wherein when the end point of the lay has touched the collider of the 3D virtual object of the character of the different card, then a capability variable of the character of the different card is fetched, and a play time of the animation is determined by comparing the fetched capability variable with a capability variable of a corresponding character.

5. The method of claim 4, wherein:
the capability variable of the character of the different card is a physical strength variable, and
the capability variable of the corresponding character is a striking power variable.

6. The method of claim 5, wherein the animation fetched and executed, when the end point of the lay has touched the collider of the 3D virtual object of the character of the different card in the fetching the animation step, is an animation indicative of an attack action of the corresponding character.

7. The method of claim 6, wherein:
the striking power variable of the capability variable of the corresponding character is subtracted from the physical strength variable of the capability variable of the character of the different card per predetermined time, and
the animation is executed until the subtracted value is a predetermined value or more.

8. The method of claim 7, wherein the value of the striking power variable subtracted per predetermined time is increased or decreased by comparing attributes of the character of the corresponding card with attributes of the character of the different card.

9. A device for playing a reactive augmented reality card game based on a check of a collision between virtual objects, the device comprising:
a display unit;
a photographing device;
one or more processors; and
memory storing one or more programs configured to be executed by the one or more processors, the one or more programs including instructions for:
photographing an image comprising at least one card by controlling the photographing device and generating and outputting a captured image of the photographed at least one card;
processing the captured image of the at least one card, detecting a card image and an image printed on the card, and outputting the detected card image and printed image;
recognizing a type of a corresponding card by searching a previously stored card DB for the detected card image and outputting card information;
computing location information of the card detected by processing the detected card image in real time and output the location information;
fetching a 3D virtual object of a character assigned to the card based on the card information composing an augmented reality image of the character by mapping the fetched 3D virtual object of the character to the captured image of the card based on the card location information, and transmitting the composed augmented reality image to the display unit; and setting a collider which is a region of a predetermined location and size with respect to the 3D virtual object of the character, setting a lay which is a straight line having a predetermined length and direction, determining whether an end point of the straight line of the lay has touched a region of a collider of a 3D virtual object of a character of a different card, and fetching a predetermined animation of the character based on a result of the determination,
wherein if determined that the end point of the straight line of the lay has touched the region of the collider of the 3D virtual object of the character of a different card, the one or more programs includes further instructions for fetching the predetermined animation of the character based on a result of the determination such that the predetermined animation is a fetched animation, and transmitting the fetched animation such that the fetched animation is mapped to the captured image of the card and executed.

10. The device of claim 9, wherein the card location information comprises a location and direction of the corresponding card.

11. The device of claim 9, wherein:
the collider is a predetermined region comprising a portion of the 3D virtual object of the character, and
the lay is a straight line having a predetermined length and direction and having a start point in a portion of the 3D virtual object of the character.

12. The device of claim 9, wherein the setting of the predetermined location and size of the collider of the 3D virtual object of the character and a start point, length and direction of the lay of the at least one card is received from a user.

13. The device of claim 9, wherein the one or more programs further include instructions for:
if determined that the end point of the lay has touched the collider of the 3D virtual object of the character of the different card, fetching a capability variable of the character of the different card, and determining a play time of the animation by comparing the fetched capability variable with a capability variable of a corresponding character.

14. The device of claim 9, wherein:
a capability variable of the character of the different card is a physical strength variable,
a capability variable of a corresponding character is a striking power variable, and
an animation fetched and executed if it is determined that the end point of the lay has touched the collider of the 3D virtual object of the character of the different card is an animation indicative of an attack action of the corresponding character.

15. The device of claim 9, wherein the lay is a straight line having a predetermined length and direction and having a start point in a portion of the card.

* * * * *